United States Patent
Kalkunte et al.

(10) Patent No.: US 6,977,892 B2
(45) Date of Patent: *Dec. 20, 2005

(54) METHOD AND APPARATUS FOR PRESERVING FLOW ORDER ACROSS LINKS OF A MULTI LINK TRUNK

(75) Inventors: Mohan V. Kalkunte, Sunnyvale, CA (US); James L. Mangin, San Ramon, CA (US); Ian Crayford, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/213,096

(22) Filed: Dec. 17, 1998

(65) Prior Publication Data

US 2003/0202472 A1 Oct. 30, 2003

Related U.S. Application Data

(63) Continuation of application No. 09/131,141, filed on Aug. 7, 1998.

(51) Int. Cl.$^7$ ............................................. H04J 1/16
(52) U.S. Cl. .................... 370/230; 370/235; 370/412
(58) Field of Search ................ 370/229, 230, 370/231, 235, 412, 413, 414, 428, 429, 445, 370/401

(56) References Cited

U.S. PATENT DOCUMENTS

| | | | |
|---|---|---|---|
| 5,307,459 A | | 4/1994 | Petersen et al. |
| 5,430,710 A | * | 7/1995 | Mueller et al. ............. 370/229 |
| 5,633,865 A | * | 5/1997 | Short ......................... 370/412 |
| 5,784,559 A | | 7/1998 | Frazier et al. |
| 5,802,054 A | * | 9/1998 | Bellenger .................... 370/401 |
| 6,021,132 A | * | 2/2000 | Muller et al. ............... 370/412 |
| 6,029,202 A | * | 2/2000 | Frazier et al. .............. 370/231 |
| 6,031,821 A | * | 2/2000 | Kalkunte et al. ........... 370/235 |
| 6,044,087 A | | 3/2000 | Muller et al. |
| 6,049,528 A | | 4/2000 | Hendel et al. |
| 6,154,464 A | | 11/2000 | Feuerstraeter et al. |
| 6,167,054 A | * | 12/2000 | Simmons et al. ........... 370/412 |
| 6,185,214 B1 | * | 2/2001 | Schwartz et al. ........... 370/401 |
| 6,192,028 B1 | | 2/2001 | Simmons et al. |

OTHER PUBLICATIONS

Congdon, "Some Objectives for Link Aggregation", *IEEE 802.3 Trunking Study Group*, (Mar. 1998), 1-10.
Cullerot, et al., "Lint Aggregation Some Requirements and Consideration", *IEEE 802.3 Trunking Study Group*,(Feb. 1998), 1-14.
De-Leon, "Flow Control for Gigabit Ethernet", *IEEE 802.3Z Task Force*, (Jul. 9, 1996), 1-31.
Grow, et al., "Gigabit Media Independent Interface Proposal", *XLNT Designs, Inc.*,(Nov. 11, 1996), 1.22.
Hendel, "Link Aggregation Trunking", *Sun Microsystems*, (Nov. 11, 1997), 1-9.

* cited by examiner

Primary Examiner—Frank Duong
(74) Attorney, Agent, or Firm—Blakely Sokoloff Taylor & Zafman LLP

(57) ABSTRACT

A method for preserving flow order is presented, the method comprising receiving up to a plurality of indications denoting commencement of frame transmission on a corresponding plurality of communication links, identifying that one or more of the received frames denote the start of a flow condition, and dedicating a receive buffer from a plurality of receive buffers to receive all frames associated with the identified flow condition.

25 Claims, 9 Drawing Sheets

*FIG. 1*
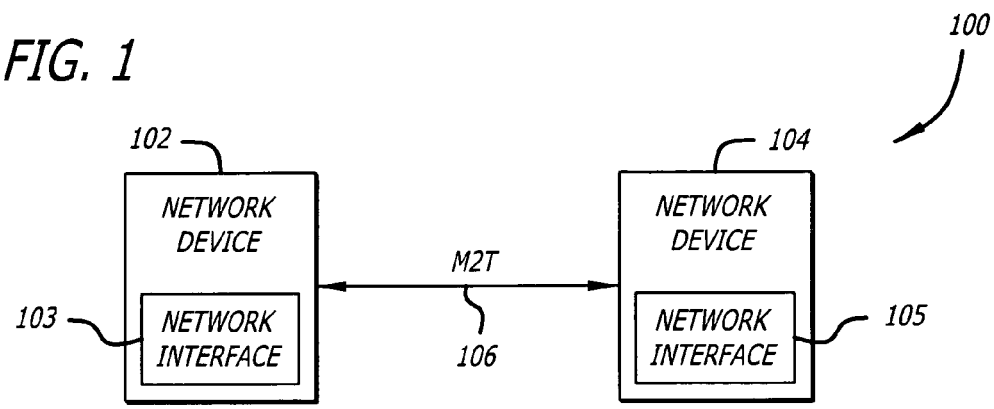
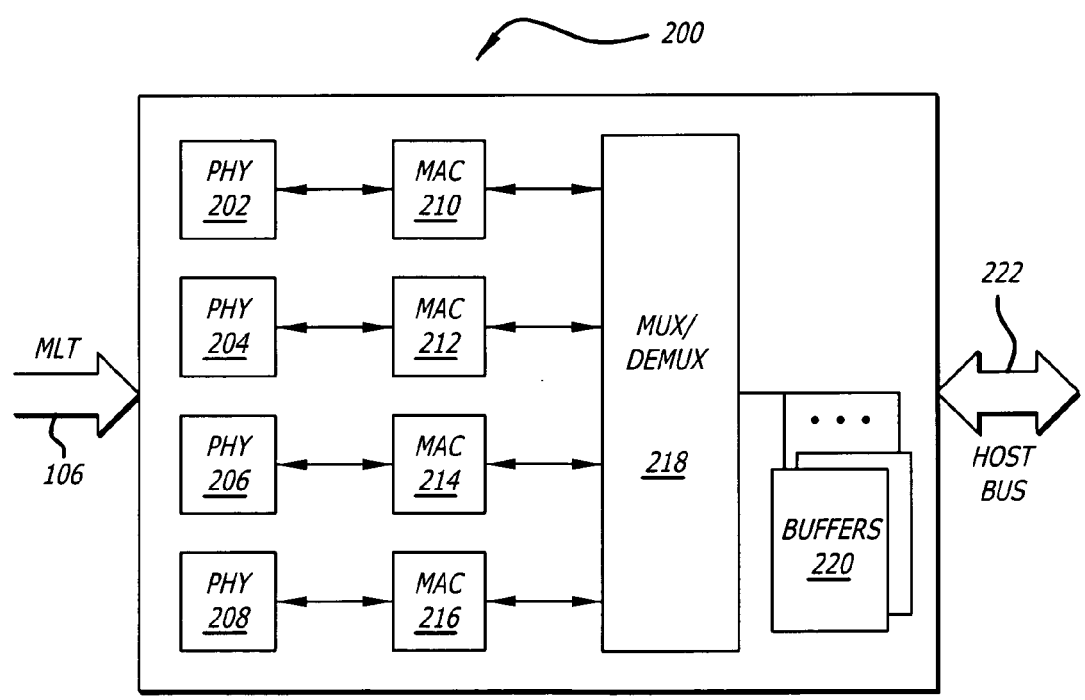
*FIG. 2*

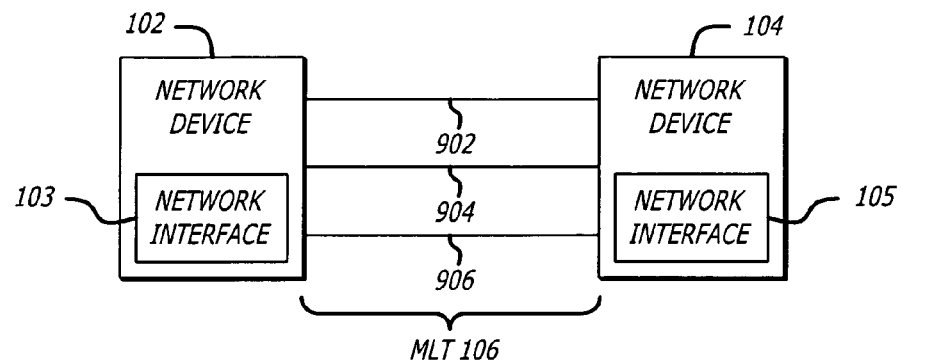
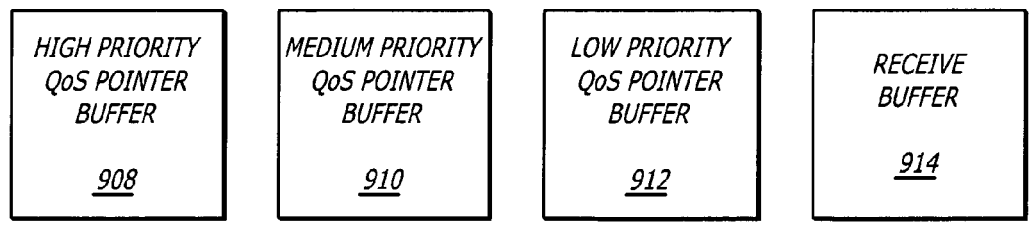
FIG. 9

METHOD AND APPARATUS FOR PRESERVING FLOW ORDER ACROSS LINKS OF A MULTI LINK TRUNK

RELATED APPLICATIONS

The present invention is a continuation of application Ser. No. 09/131,141 entitled Method and Apparatus for Preserving Frame Ordering Across Aggregated Links Between Source and Destination Nodes, filed on Aug. 7, 1998 by the inventors of the present invention, and commonly assigned to the assignee of the present invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND OF THE INVENTION

1. Field of the Invention

The present invention relates to the field of data networking and, in particular, to a method and apparatus for preserving flow order across links of an multi-link trunk (MLT).

2. Background Information

As computer technology has evolved, so too has the use of networks which communicatively couple computer systems together allowing remote computer systems to communicate with one another. The improved computer technology, along with the widely distributed nature of corporate computing and the cost/accessibility of high bandwidth data networks has fostered the growth of multi-media network applications over such networks. One example of just such a network topology is the Ethernet standard topology. In recent years, we have seen the Ethernet standard evolve from a 10 Mb/S standard to a 100 Mb/S standard as we race towards the 1 Gb/S standard. Although the prospect of gigabit Ethernet technology will reduce much of the congestion experienced on current Ethernet LAN implementations, those skilled in the art recognize that the additional bandwidth will quickly be consumed by bandwidth-hungry multimedia applications. Thus, another approach is required to improve the bandwidth efficiency of such networks.

One approach currently being considered is the use of multiple physical data links to facilitate the transmission of information, a method commonly referred to as link aggregation. Those skilled in the art will appreciate that link aggregation is a technique which permits one to treat multiple physical links as one logical link, also commonly referred to as a multiple link trunk (MLT). Link aggregation is the topic of study for the Institute for Electrical and Electronic Engineers (IEEE) 802.3ad study group, which is working to define protocols for the exchange of traffic over multi-link trunks. One of the objectives of the study group is maintaining the ordering of frames. In many network protocols receiving frames out of order is likely to cause confusion. Indeed, the ramifications of processing out of order frames are often unpredictable and thus, undesirable. Similarly, the receipt of duplicate frames can also cause problems in many communication protocols. The typical solution to having received an out-of-order and/or duplicate frame sequence is the retransmission of the entire frame sequence. Given a no-contention network architecture such as, for example, the Ethernet network wherein only one network element may be actively transmitting at a time, the need to retransmit entire frame sequences significantly reduces network efficiency.

To improve the efficiency of such networks, a number of solutions are currently being considered to preserve frame ordering across aggregated links, the so-called multi-link trunk. To date, proposed solutions focus on the transmit side of the communication. One proposed solution, for example, relies on tagging frames with sequence numbers at the transmit side, and removing the sequence numbers from the frames as the frames are received and promoted. Although this method is currently favored in the technical community as providing an easy resolution of the problem, those skilled in the art recognize that such a solution is a costly one insofar as it involves altering the frame structure. That is, instead of simply routing frames a network bridge or switch, for example, must modify the frames to add the sequence numbers, thereby violating a number of bridging protocols. By violating such bridging protocols, a problem of backward compatibility is created, leaving legacy bridges that are unable of supporting aggregated link communication sessions.

Another problem commonly associated with prior art aggregated link control techniques arises on the transmit side when handling "flows", i.e., a sequence of messages or frames that have the same source, destination and quality of service requirements. Prior art switches identify a flow and queue the frames identified as a flow on a single, particular link. Those skilled in the art will appreciate that queuing a flow through a single link, as done in the prior art, eliminates many of the benefits commonly associated with use of an aggregated link, e.g., maximizing throughput, load balancing, etc. due to the management required to switch the entire flow to another physical link.

Thus a method and apparatus for preserving frame ordering across aggregated links between source and destination nodes is required that does not resort to modification of the frames themselves. Accordingly, a method and apparatus for preserving frame ordering across aggregated links is presented which is unencumbered by the inherent deficiencies and limitations commonly associated with the prior art.

SUMMARY OF THE INVENTION

In accordance with the teachings of the present invention, a method and apparatus for preserving flow order across multiple links of a multi-link trunk (MLT) is presented. In particular, in accordance with one embodiment of the present invention, a method for preserving flow order is presented, the method comprising receiving up to a plurality of indications denoting commencement of frame transmission on a corresponding plurality of communication links, identifying that one or more of the received frames denote the start of a flow condition, and dedicating a receive buffer from a plurality of receive buffers to receive all frames associated with the identified flow condition.

BRIEF DESCRIPTION OF DRAWINGS

The present invention will be described by way of exemplary embodiments, but not limitations, illustrated in the accompanying drawing in which like references denote similar elements, and in which:

FIG. 1 illustrates a block diagram of an example data network within which the teachings of the present invention may be practiced;

FIG. 2 illustrates a block diagram of an example apparatus incorporating the teachings of the present invention, in accordance with one embodiment of the present invention;

FIG. 9 illustrates a block diagram of a data network including a network interface(s) incorporating the teachings of the present invention which interface to an MLT providing Quality of Service (QoS) features, in accordance with one aspect of the present invention.

DETAILED DESCRIPTION OF THE INVENTION

Figure 3:
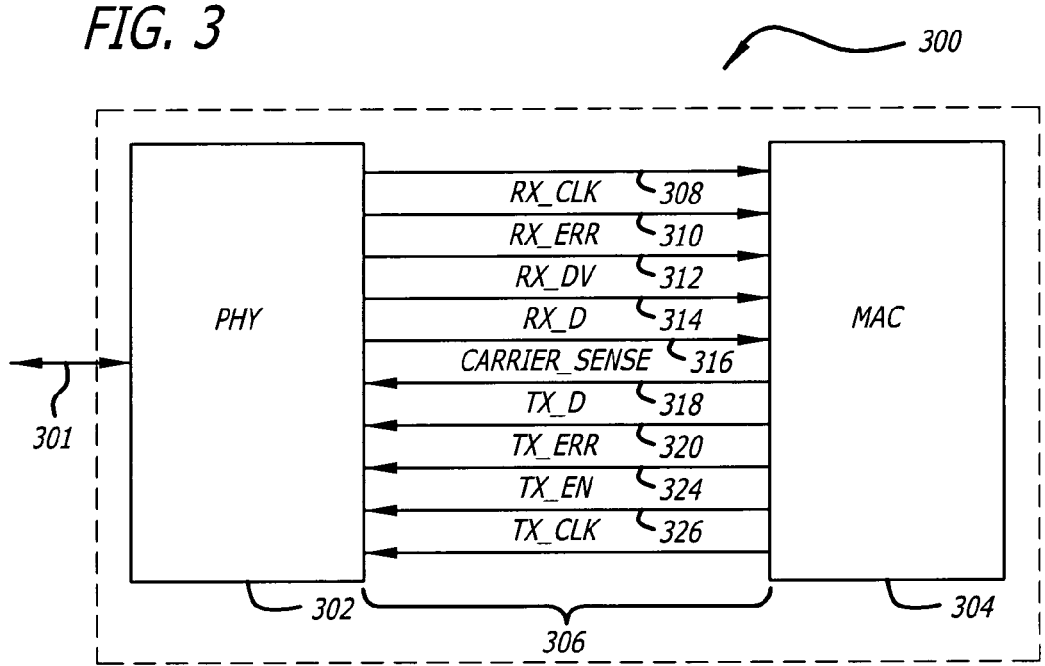
FIG. 3 graphically illustrates one example of a media independent interface (MII) suitable for use by the apparatus introduced in FIG. 2, in accordance with one embodiment of the present invention.

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Turning to FIG. 1, a block diagram of an example data network 100 within which the teachings of the present invention may be practiced is presented. More specifically, FIG. 1 is a block diagram depicting a data network 100 in which network device 102 is communicatively coupled to network device 104 via an aggregated link, the so-called multi-link trunk (MLT) 106. In accordance with the teachings of the present invention, a network device incorporating a network interface endowed with the teachings of the present invention preserves the transmission frame order of a plurality of frames communicated via a plurality of physical links by relying on an indication of the commencement of frame transmission. That is, unlike prior art solutions wherein the frames themselves are tagged with an indication of relative sequence at the transmit node, it will be shown that the present invention relies on standard signaling to determine when frame transmission is commenced, and the frame order is tracked and preserved by the receiving node.

Further, those skilled in the art will appreciate that the present invention for preserving frame ordering is an enabling technology leading to improved transmission techniques, receiver performance and network performance enhancements (e.g., quality of service, multi-speed links, etc.), which are all aspects of the present invention. Finally, those skilled in the art will appreciate that the innovative method of preserving frame order, to be described more fully below, may be practiced within the scope of current network communication protocol standards and specifications, thus enabling a network device endowed with the teachings of the present invention to interface with legacy network devices. These and other aspects of the present invention will be developed more fully below.

As depicted in the illustrated example embodiment of FIG. 1, network device 102 is coupled to network device 104 via aggregated link 106. As described above, aggregated link (e.g., MLT) 106 is a combination of two or more physical links comprising a single logical communication channel between two network nodes, e.g., network device 102 and network device 104. Each physical link of MLT 106 communicates data packets (also commonly referred to as frames, datagrams, etc., depending on the OSI level of implementation) between two network devices, irrespective of the other physical links. As described above, many network protocols require that frame ordering be preserved in order to ensure the valid transmission of information between network devices. Accordingly, insofar as the physical links themselves independently communicate frames irrespective of the other links comprising the MLT, the network devices may employ some means of preserving frame ordering. Those skilled in the art will appreciate, from the description to follow, that network interface 103 and/or 105, relying on signaling already defined within certain network standards, e.g., Ethernet standard 802, preserve frame transmission order state information by capturing the received frames in records of a buffer and assigning pointer values to the records based on order of transmission, thereby overcoming the need of prior art solutions to tag each individual frame with a sequence number at the transmitting node, or sending flows on a particular dedicated link.

With continued reference to data network 100 depicted in FIG. 1, those skilled in the art will appreciate data network 100 depicting only two nodes has been simplified for ease of explanation and so as to not obscure the teachings of the present invention. That is, those skilled in the art will appreciate that data network 100 is typically comprised of a number of network devices such as, for example, routers, hubs, servers, switches and the like utilized to route data packets through the network to their respective destinations. Thus, data network 100 of FIG. 1 is intended to represent any of a number of alternative network architectures incorporating switches, routers, and the like (not shown) that are commonly used to establish and support data communication between network edge devices such as, for example, network devices 102 and 106. In this respect, data network 100 may well be a Local Area Network (LAN), a Wide Area Network (WAN) network architecture, and the like. In one embodiment, for example, data network 100 is an Ethernet standard network providing 10 Mb/s, 100 Mb/s or 1 Gb/s data rates. Similarly, except for the innovative method of preserving frame order, optimizing transmission and receiver performance, and other aspects of the present invention, network devices 102 and 106 are intended to represent any of a number of alternative routers, switches, hubs, servers, and the like commonly known within the data networking art.

Having described the operating environment within which the teachings of the present invention may be practiced with reference to FIG. 1, a block diagram of an example network interface incorporating the teachings of the present invention will be introduced with reference to FIG. 2.

Turning to FIG. 2, a block diagram of an example network interface incorporating the teachings of the present invention is depicted. In one embodiment of the present invention, network interface 200 is beneficially introduced to network device 102 and/or network device 104 as network interface 103 and/or 105, respectively. In accordance with the illustrated example embodiment of FIG. 2, network interface 200 is communicatively coupled to a data network via a multi-link trunk, e.g., MLT 106, as well as data terminal equipment (DTE) (not shown) via bus 222. As shown, network interface 200 is depicted comprising a plurality of physical medium interfaces (PHY) 202, 204, 206 and 208 each coupled to an associated medium access controller 210, 212, 214 and 216, respectively, which are coupled to a Multiplexer/DeMultiplexer (MUX/DeMUX) 218, as shown. In accordance with one embodiment of the present invention, MUX/DeMUX 218 is coupled to one or more buffer(s) 220 which may be used as transmit buffers or receive buffers. In accordance with one embodiment of the present invention, the number of physical medium interfaces 202–208 corresponds to the number of physical links comprising the multi-link trunk 106, and the number of MACs 210–216 correspond to the number of PHYs 202–208. Accordingly, the MUX/DeMUX 218 multiplexes frames to/from the plurality of physical links of MLT 106 via a corresponding MAC and PHY.

As defined herein, the physical medium interface (PHY) 202–208 provides the physical and electrical interface between network interface 200 and the multi-link trunk 106 using any of a number of medium attachment units (MAU) known in the art (e.g., tap connector, BNC "T", and the like). In one embodiment, PHY 202–208 is responsible for encoding/decoding data in accordance with the transmission protocol of MLT 106. That is, in its function as a receiver, PHY 202–208 decodes an encoded transmission received from a physical link of MLT 106 for presentation to MAC 210–216, and the DTE respectively. Conversely, in its function as transmitter, PHY 202–208 encodes frames received from the DTE by way of MAC 210–216 for transmission via a corresponding physical link of MLT 106. In one embodiment, PHY 202–208 employs a Manchester encoder/decoder. In an alternate embodiment, PHY 202–208 employs a Viterbi encoder/decoder. In yet another embodiment, an 8B/10B encoding scheme is employed to facilitate gigabit Ethernet over fiber. Irregardless of the encoding technique employed, PHY 202–208 employs a media independent interface (MII) protocol to communicate with MAC 210–216. Those skilled in the art will appreciate that the MII defines a set of communication signals and protocols for communication between MAC 202–208 and PHY 210–216, respectively. That is, MII enables MACs to communicate with any of a number of alternate PHYs adhering to the MII protocol. One example of an MII between MAC 202–208 and PHY 210–216 is depicted with reference to FIG. 3.

Turning, briefly, to FIG. 3 an example media independent interface (MII) 306 is shown coupling physical medium interface 302 with media access controller 304. As depicted, MII 306 is comprised of a number of receive signals, transmit signals and control signals. In accordance with the illustrated example embodiment of FIG. 3, MII 306 is shown comprising receive clock (RX_CLK) 308, receive error (RX_ERR) 310, receive data valid (RX_DV) 312, receive data (RX_D) 314, carrier sense (CRS) 316, transmit data (TX_D) 318, transmit error (TX_ER) 320, transmit enable (TX_EN) 324 and transmit clock (TX_CLK) 326 signals. As used herein, the label of transmit and receive are relative to MAC 304, thus, RX_D signal 314 provides data transmitted from PHY 302. In one embodiment, RX_D signal 314 is a nibble-wide (e.g., four bit) signal, while in an alternate embodiment, RX_D signal 314 an eight-bit (e.g., an octet wide) signal.

Except as used in accordance with the teachings of the present invention, to be described more fully below, the function of each of the MII signals 308–326 of are generally well known in the art and, thus, need not be further described here. Of particular interest with respect to the teachings of the present invention, however, is the receive data valid signal RX_DV 312. Those skilled in the art will appreciate that RX_DV signal 312 is asserted by PHY 302 to indicate that valid data decoded from the physical medium is being presented on RX_D 314. More specifically, PHY 302 asserts RX_DV signal 312 to denote to MAC 304 that frame transmission has commenced, and that the frames presented on RX_D 314 are valid (e.g., do not contain errors). In accordance with the teachings of the present invention, RX_DV 312 is asserted any time during or immediately after a preamble of the transmitted frame. That is, the RX_DV signal 312 provides an indication to the MAC that frame transmission has commenced on a physical link associated with the PHY asserting the RX_DV signal. In accordance with one embodiment of the present invention, the RX_DV signal 312 is an analog signal that is asserted upon detecting valid data, and remains asserted throughout transmission of the frame. Thus, in accordance with the teachings of the present invention to be developed more fully below, network interface 200 utilizes the indication provided by the assertion of RX_DV signal 312 associated with each PHY to determine frame transmission order.

Returning to the illustrated example embodiment of FIG. 2, MACs 210–216 interface the data terminal equipment (DTE) with data network 100 via the physical interface (PHY) 202–208. Accordingly, MACs 210–216 transmit and receive messages to/from the DTE, perform message encapsulation and control (framing, addressing, synchronization, error detection, etc.) as well as media access management functions (collision avoidance, contention resolution, etc.).

In accordance with the illustrated example embodiment of FIG. 2, a single MAC (e.g., MAC 210) is associated with a single PHY (e.g., PHY 202) and corresponding physical link of the MLT. In accordance with the illustrated example embodiment of FIG. 2, MACs 210–216 are coupled to MUX/DeMUX 218. As will be described in greater detail below, the MUX/DeMUX layer 218 receives frames of information to be transmitted from the DTE in a transmit buffer 220 and distributes the frames to MACs 210–216. Conversely, MUX/DeMUX 218 receives decoded frames received from MACs 210–216 and promotes them from a receive buffer 220 to a system state at the DTE in a serialized manner via bus 222. Those skilled in the art will appreciate, from the description to follow, that MUX/DeMUX 218 may well be found in any of a number of alternate forms with alternate names. In one embodiment, for example, the function of MUX/DeMUX 218 is embodied in a logical MAC (LMAC) supporting a plurality of physical MACs (PMAC), e.g., MAC 210–216. In an alternate embodiment, the MUX/DeMUX function is embodied in an aggregated MAC (AMAC) supporting a plurality of physical MACs. Those skilled in the art will recognize that, although different in name, the teachings of the present invention may be practiced an a variation of forms without deviating from the spirit and scope of the present invention.

In accordance with the teachings of the present invention, the order in which a received frame is promoted from receive buffer 220 corresponds to the relative order in which the RX_DV signal 312 associated with the particular frame is received. In one embodiment, to be described more fully below, further optimization of the receive function can be achieved by detecting "flow" conditions. That is, in accordance with one aspect of the present invention, network interface 200 identifies a flow condition, and allocates specific resources (e.g., receive buffers, pointer buffers, etc.) to handle the flow, thereby reducing the processing required to ensure frame ordering.

Figure 4:
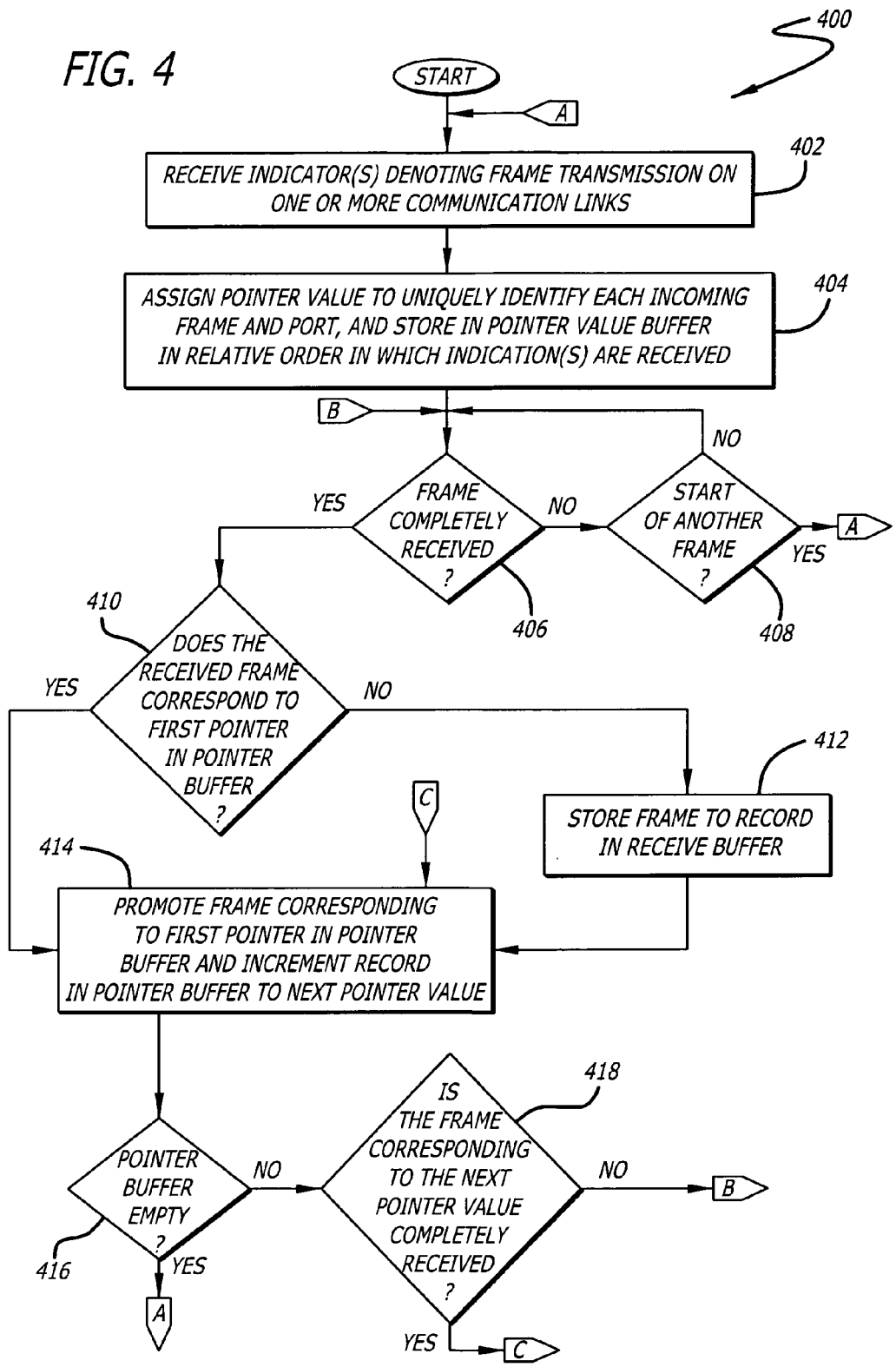
FIG. 4 illustrates a flow chart of an example method for preserving frame ordering across an aggregated link incorporating the teachings of the present invention, in accordance with one embodiment of the present invention.

Having introduced an example operating environment, hardware architecture and communication interface associated with the teachings of the present invention with reference to the block diagrams of FIGS. 1 through 3, attention is now directed to FIG. 4 wherein a flow chart of an example method for preserving frame ordering is presented, in accordance with one embodiment of the present invention. For ease of explanation, and not limitation, the example embodiment of FIG. 4 will be developed with continued reference to FIGS. 1–3, wherein network device 102 is the source node utilizing a number of physical links of MLT 106 to communicate with network device 104, the destination node.

Turning to the method of FIG. 4, the method begins with source node 102 commencing transmission of up to a plurality of frames over a plurality of physical links comprising MLT 106. Upon detecting the commencement of frame transmission on any of the physical links comprising MLT 106, the PHY 202–208 of the destination node network interface 105 corresponding to the physical link with transmission activity asserts an RX_DV signal 312. That is, once PHY 202, for example, detects valid data transmission via a corresponding physical link, PHY 202 asserts an RX_DV signal 312, i.e., an indication of the commencement of frame transmission, to MAC 210 at 402 denoting that valid receive data is being received on RX_D 314. As MAC 210 receives the RX_DV signal 312, it provides an indication to MUX/DeMUX 218 of the incoming frame which generates a pointer in a pointer buffer 220 associated with the frame, 404. MAC 210 receives the transmitted frame (a nibble, byte, word, etc. at a time) via RX_D 314. Consequently, by generating a pointer list associated with the assertion of RX_DV signals, MUX/DeMUX 218 preserves the state of frame transmission order without unnecessarily modifying the content of the transmitted frames as done in the prior art. At 406, a determination made of whether the incoming frame is completely received. If not, a further determination is made at 408 of whether another incoming frame has been detected on another physical link. If so, the process continues with 402 as the next frames are received, otherwise, the process continues with block 406 until the frame is completely received.

Once a frame is completely received, a determination is made as to whether the received frame corresponds to the first pointer value in the pointer buffer, 410. If not, the frame is stored to the next available record in the receive buffer, 412. If, however, the received frame does correspond to the first pointer value in the pointer buffer, the frame is promoted to the system state at the DTE, and the pointer buffer is incremented to the next pointer value record, 414. At 416, MUX/DeMUX 218 determines whether the pointer buffer is empty and, if so, the process returns to block 402. If the pointer buffer is not empty, the process continues at 418 wherein MUX/DeMUX 218 determines whether the frame corresponding to the next pointer value record in the pointer buffer has been completely received. If not, the process continues with block 406. If, however, MUX/DeMUX 218 determines that the frame corresponding to the next pointer value in the pointer buffer has been received, the process continues with block 414.

Although discussed above as separate buffers, those skilled in the art will appreciate that the pointer values and the frames themselves may well be stored in a common buffer without deviating from the spirit and scope of the present invention. That is to say that the innovation of preserving state information of the order of frame transmission on the receive side by relying on network standard signaling which denotes the commencement of frame transmission, assigning a pointer value to identify the received frame, and then promoting the frames to a system state in order of pointer value may well be practiced in many different forms in many different network architectures/topologies without deviating from the spirit and scope of the present invention. Accordingly, such embodiments are anticipated by the teachings of the present invention.

Figure 5:
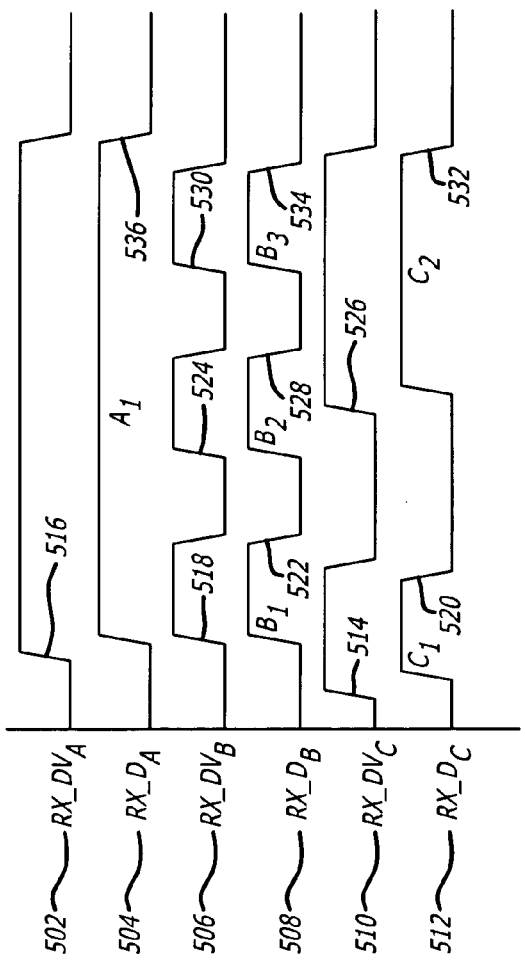
FIG. 5 graphically illustrates a timing diagram of MII signaling as data is received at a network interface incorporating the teachings of the present invention, in accordance with one embodiment of the present invention.

Having described an example architecture and method of certain embodiments of the present invention above, it may be helpful to illustrate the operation of the present invention in terms of a timing diagram, such as that presented in FIG. 5. That is, FIG. 5 provides a timing diagram depicting RX_DV 312 and RX_D 314 for three (3) physical links (A, B, and C), along with a graphical illustration of an example pointer buffer and an example receive buffer, respectively.

In accordance with the illustrated embodiment of FIG. 5, transmission from source node 102 begins on physical link C as denoted by the assertion of RX_DV$_C$ 510 at position 514. As described above, the assertion of RX_DV$_C$ 510 denotes that a valid frame (C$_1$) is being received on RX_D$_C$ 512. Thus, in accordance with the teachings of the present invention, a pointer to frame C$_1$ is placed in pointer value buffer 538. As frame C$_1$ is being received, an indication is received in the form of RX_DV$_A$ 502 that a valid frame (A$_1$) is being received on RX_D$_A$ 504 at position 516. As above, in accordance with the teachings of the present invention, a pointer to frame A$_1$ is placed in a subsequent record of pointer value buffer 538. Further, as frame C$_1$ is being received, an indication is received in the form of RX_DV$_B$ 506 that a valid frame (B$_1$) is being received on RX_D$_B$ 508 at position 518. In accordance with the teachings of the present invention, a pointer associated with frame $B_1$ is stored in a subsequent record of pointer buffer 538.

Continuing along the timing diagram, at position 520, as frames $B_1$ and $A_1$ are still being received via their respective links, frame $C_1$ is completely received without receiving an error (e.g., RX_ER). In accordance with the teachings of the present invention, insofar as the pointer to frame $C_1$ resides atop pointer buffer 538 it is promoted to a system state at the DTE once it is completely received. As the pointer value to frame $C_1$ is promoted from pointer buffer 538, the pointer associated with frame $A_1$ now resides atop pointer value buffer. At position 522, frame $B_1$ is completely received and stored in a subsequent record of receiver buffer 540, as shown. However, in accordance with the teachings of the present invention, frame $B_1$ is not promoted until frame $A_1$ has been promoted, insofar as the pointer value for frame $A_1$ has a higher priority within the pointer buffer.

At position 524, while frame $A_1$ is still being received, an indication is received from $RX\_DV_B$ 506 that a valid frame ($B_2$) is being received via $RX\_D_B$ 508. Thus, in accordance with the teachings of the present invention, a pointer value corresponding to frame $B_2$ is placed in a subsequent record of pointer buffer 538. While frame $B_2$ is being received, an indication is received from $RX\_DV_C$ 510 at position 526 that a valid frame ($C_2$) is being received via $RX\_D_C$ 512. Accordingly, a pointer value corresponding to frame $C_2$ is placed in a subsequent record of pointer value buffer 538. At position 528, while $A_1$ and $C_2$ are being received, frame $B_2$ is completely received without indication of error and is stored in a subsequent record of receive buffer 540, as depicted. As above with respect to frame $B_1$, although frame $B_2$ has been completely received, it cannot be promoted to the upper layer until frames $A_1$ and $B_1$ are promoted.

Subsequently, while frames $A_1$ and $C_2$ are being received, an indication is received in the form of $RX\_DV_B$ 506 that a valid frame ($B_3$) is being received on $RX\_D_B$ 508 at position 530. In accordance with the teachings of the present invention, a pointer value to frame $B_3$ is placed in a subsequent record of pointer value buffer 538, as depicted. At position 534, while frames $A_1$ and $C_2$ are still being received, frame $B_3$ is completely received without indication of error, and is stored to a subsequent record of receive buffer 540, as shown. As above, frame $B_3$ cannot be promoted until the frames corresponding to pointer values ahead of the pointer value corresponding to $B_3$ are promoted. At position 532, frame $C_2$ is completely received without indication of error and is stored to a subsequent record of receive buffer 540, as shown. Finally, at position 536, frame $A_1$ is completely received without indication of error and is stored in a subsequent record of receive buffer 540 as shown.

In accordance with the teachings of the present invention, since the pointer to frame $A_1$ is at the top of pointer buffer 538 once the frame is completely received at position 536, it is promoted to a system state with DTE. Further, since frames B1, B2, C2 and B3 have also been previously received and stored within receive buffer 540, they are similarly promoted in the order in which frame transmission commenced, as denoted in pointer buffer 538. Thus, rather than altering the content of the frame to denote a sequence number as done in the prior art, a network interface employing the teachings of the present invention relies on an indication of the commencement of frame transmission to preserve the state of frame order transmission. That is, frames are promoted to upper layers in order of frame transmission as recorded by the receiving node relying on standard signaling denoting the commencement of frame transmission.

Figure 6:
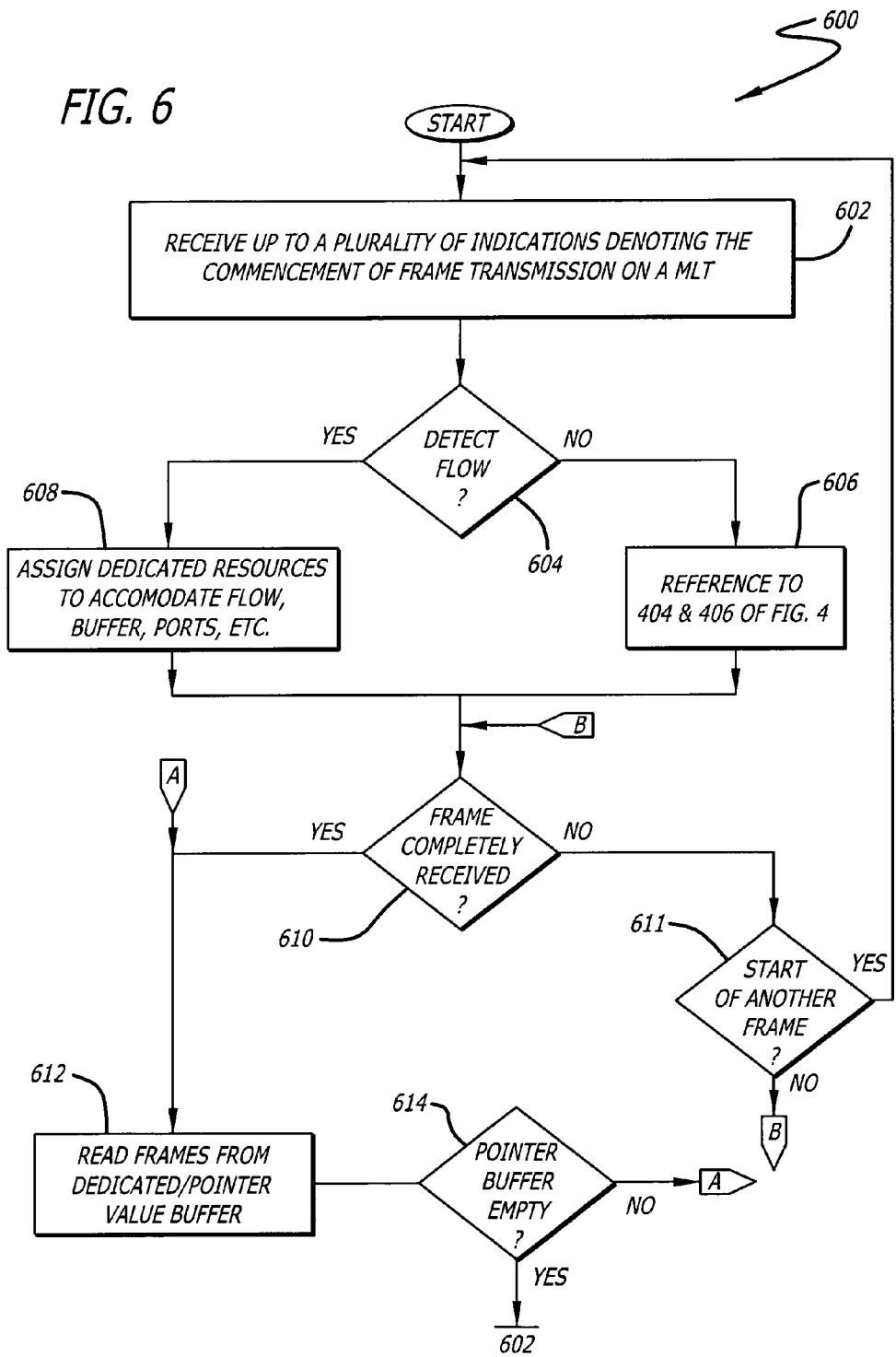
FIG. 6 illustrates a flow chart of an example method for preserving frame transmission order state information when a flow condition is detected, in accordance with one aspect of the present invention.

Having described a method and apparatus for preserving the order of frame transmission above with reference to FIGS. 1–5, a flow chart of an example method for improving the receive performance of a network interface is depicted in FIG. 6, in accordance with one embodiment of the present invention. With reference to FIG. 6, a network interface incorporating the teachings of the present invention, e.g., network interface 300, receives up to a plurality of indications denoting the commencement of frame transmission over an MLT, 602. At 604, a determination is made as to whether the received frames constitute a subset of a flow, i.e., a sequence of messages that have the same source, destination and quality of service requirements. In one embodiment, the DeMUX layer 218 identifies a flow by analyzing control information embedded within a frame to identify the source, destination, quality of service, and other similar information. If, at 604, it is determined that the received frames do not constitute a flow, the method proceeds to assign pointer values and store received frames until they can be promoted, on a per frame basis, as described above with reference to FIG. 4, at 606.

Alternatively, if a flow is detected at 604, DeMUX layer 218 allocates specific resources to enable the frames to be processed through to the DTE without further re-ordering at the network interface, 608. That is, recognizing that some protocols are not adversely impacted by out of order transmission (e.g., certain implementations of TCP/IP), the DeMUX layer 218 identifies such frames and passes them through to the DTE without regard to frame order, thereby increasing the receive forwarding rate and reducing the processing associated with buffering such frames. As described above with reference to FIG. 4, a determination is made at 610, on a per frame basis, of whether transmission is complete or the pointer buffer is empty. If transmission on a per frame basis is complete, frames are read from the receive buffer as described above in FIG. 4, 612. Alternatively, if transmission is not complete, a further determination is made, 611, of whether frame transmission on another physical link has been detected. If transmission of another frame has commenced, the process continues with block 602, while transmission of the former frame is completed. If, however, no addition indications of frame commencement are received, the process continues with block 610 until the frame is completely received.

At 614, a determination is made by MUX/DeMUX 218 of whether the pointer buffer is empty and, if so, the process continues with block 602, as the MUX/DeMUX 218 awaits further indication(s) of the commencement of frame transmission via MLT 106. Alternatively, if the pointer buffer is not complete, the process returns to block 612 as the next record is read from the receive buffer and promoted to the DTE, as described above.

Thus, in accordance with one aspect of the present invention, a network interface incorporating the teachings of the present invention enhances the receive efficiency of a flow by determining whether the flow is sensitive to out-of-order frame sequences and, if not, passes the frames directly through to the DTE without the need of buffering. Expanding on the teachings of the present invention, described above, an improved method for handling flows is now presented, in accordance with another aspect of the present invention. That is, in accordance with one aspect of the present invention, a destination node incorporated with the teachings of the present invention, e.g., network device 104, creates and maintains a separate pointer buffer dedicated to each detected flow, while continuing to utilize a common receive buffer. In accordance with this aspect of the present invention, all frames associated with a particular flow have pointers set up in a dedicated pointer buffer in the order in which frame transmission commenced. When a frame has been completely received at the receiver, if it is the first pointer in a particular pointer buffer, it is passed to the upper layer without regard to the frames associated with other pointer buffers. By maintaining separate pointer buffers (or link lists) for each flow, frames from one flow do not have to wait for frames from other flows to arrive before they are promoted to an upper layer. Those skilled in the art will appreciate that a further advantage of the present invention is that is a physical link were to go down, the frames can be distributed on the remaining links without the need to flush transmit queues before transmission can resume. A timing diagram illustrating this aspect of the present invention is presented with reference to FIG. 7.

Figure 7:
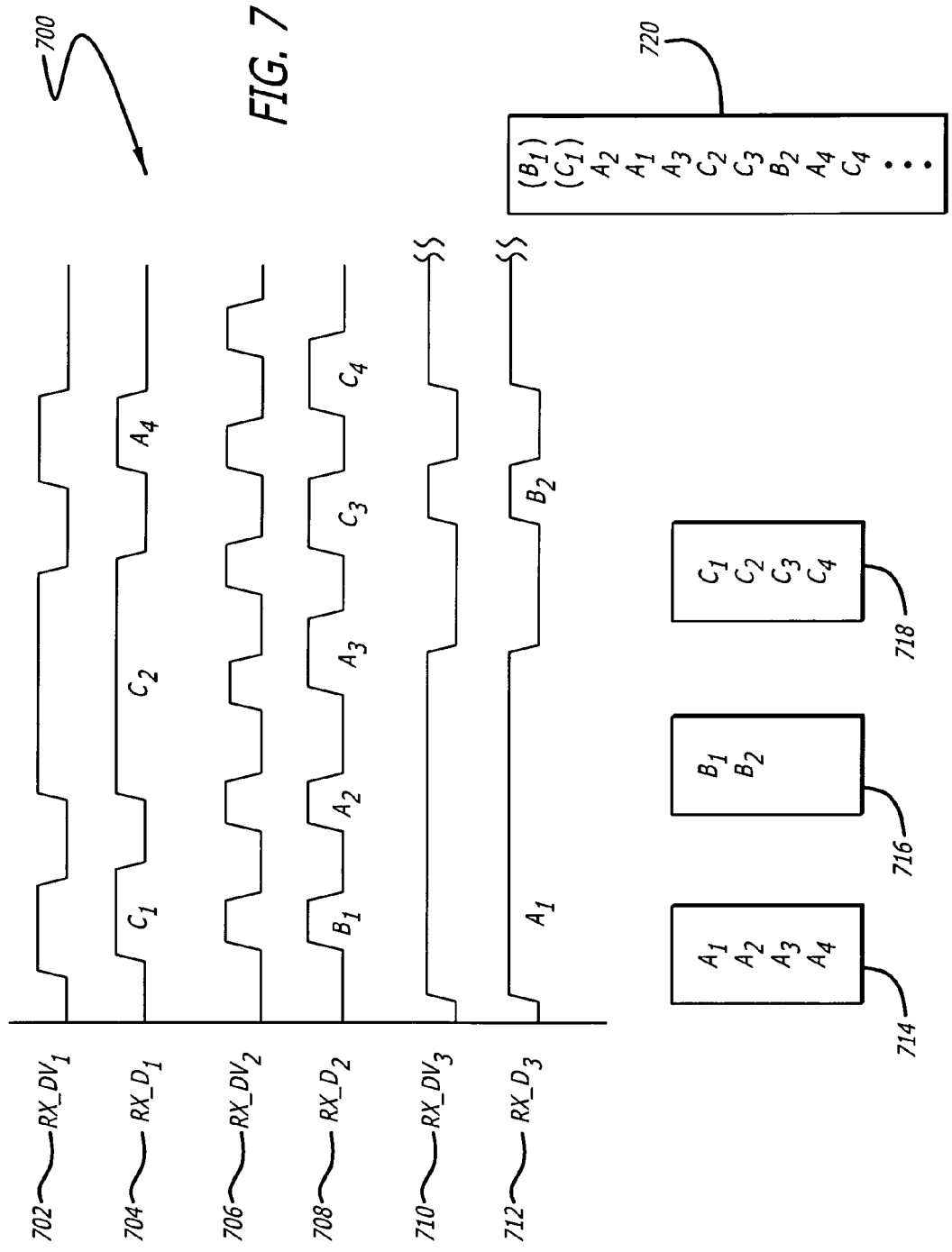
FIG. 7 illustrates a timing diagram of MII signaling as data is received in a flow condition at a network interface incorporating the teachings of the present invention, in accordance with one embodiment of the present invention.

Turning to FIG. 7, a timing diagram of illustrating the RX_DV signals 702, 706, 710 and RX_D 704, 708, 712 signals for three physical links (1, 2 and 3) are depicted. In addition, FIG. 7 also depicts pointer buffers 714, 716 and 718 created upon the detection of flows A, B and C, respectively, and receive buffer 720. As shown in FIG. 7, individual pointer values are assigned to frames upon receiving an indication of the commencement of frame transmission and determining whether the incoming frame corresponds to a flow. In one embodiment, a minimal amount of data must first be received before it is determined that the incoming frame is associated with a particular flow, before a pointer value is assigned to the incoming frame. In an alternate embodiment, however, a pointer value is assigned based, at least in part, on a physical link upon which a known flow condition is present. In addition, frames are promoted from receive buffer 720 in pointer value order, as stored in pointer buffers 714, 716 and 718. Thus, frames $B_1$ and $C_1$ are immediately promoted upon receipt without regard to frame $A_1$. $A_2$, however, must wait until frame $A_1$ has been completely received and promoted before it may be promoted, in accordance with the teachings of the present invention described above. In this way, the load balancing and efficient transmission characteristics commonly associated with aggregated link technology can be realized, while preserving the state of frame transmission order for a plurality of identified flows, without resorting to dedicated links, or altering the frame to denote transmission sequence.

Figure 8:
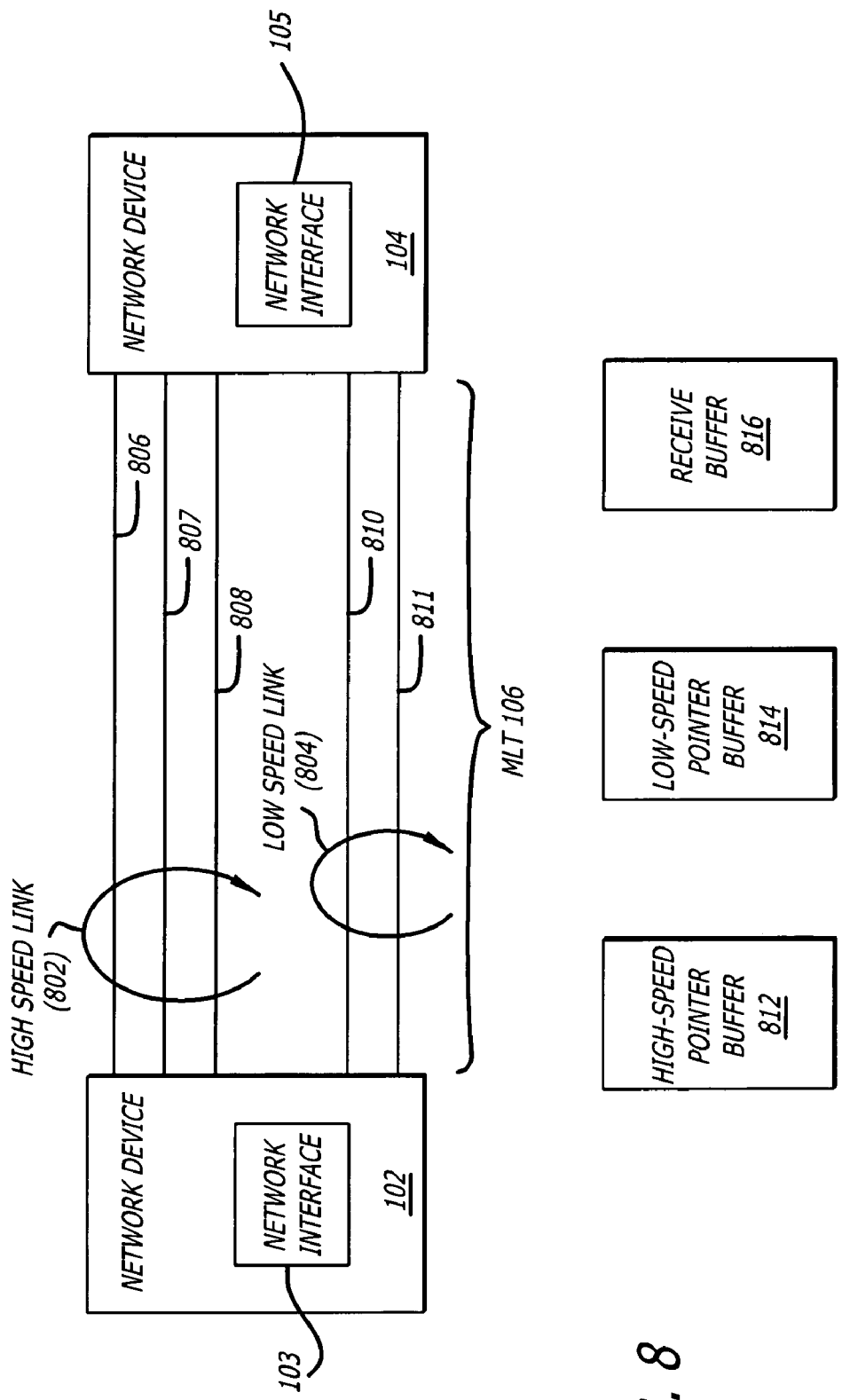
FIG. 8 illustrates a block diagram of a data network including a network interface(s) incorporating the teachings of the present invention which interface to multi-speed communication links, in accordance with one aspect of the present invention.

A further aspect of the present invention is illustrated with reference to the network depicted in FIG. 8. As depicted in FIG. 8, network device 102 having network interface 103 is communicatively coupled to network device 104 having network interface 105 via MLT 106, much as in FIG. 1. In accordance with this aspect of the present invention, however, the physical links of the MLT 106 are split into high-speed links 802 and low-speed links 804. As depicted, high-speed links 802 are comprised of physical links 806, 807 and 808, while low speed links are depicted as 810 and 811. In accordance with this aspect of the invention, a network interface incorporating the teachings of the present invention (e.g., network interface 103 and/or network interface 105) creates a separate pointer buffer for the high-speed links 802 and the low speed links 804. That is, as shown in FIG. 8, a network interface incorporating the teachings of the present invention, employs high-speed pointer buffer 812 and low-speed pointer buffer 814 to maintain separate link lists of pointers values corresponding to frames stored in receive buffer 816. In accordance with this aspect of the present invention, frames are promoted from receive buffer 816 in order of pointer value with priority given to pointer values in high-speed pointer buffer 812 over low-speed pointer buffer 814. In one embodiment, for example, frames corresponding to pointer values residing in low-speed pointer buffer 814 are not-promoted until high-speed pointer buffer 812 is completely empty, i.e., receive buffer 816 is void of any frames received via one of high-speed links 802.

Extending this concept further, another aspect of the present invention emerges as the teachings of present invention preserve the state of frame transmission order enabling Quality of Service (QoS) features. As depicted in FIG. 9, network device 102 with network interface 103 is communicatively coupled to network device 104 with network interface 105 via MLT 106 offering physical links associated with three distinct QoS priority levels. More specifically, MLT 106 offers a high priority QoS link 902, a medium priority QoS link 904 and a low priority QoS link 906. In accordance with the teachings of the present invention, described more fully above, a network interface incorporating the teachings of the present invention, e.g., 103 and/or 105, establishes a pointer buffer for each of the QoS links 902–906. That is, in accordance with the teachings of the present invention, a high priority QoS pointer buffer 908, a medium priority QoS pointer buffer 910 and a low priority QoS pointer buffer 910 are established to preserve the state of frame transmission order of received frames. In one embodiment of the present invention, frames are promoted to the DTE from receive buffer 914 in order of pointer value, with priority given to high priority QoS pointer buffer 908, while frames associated with pointer values are promoted from medium and low priority QoS pointer buffers 910 and 912, once higher priority frames have been processed.

Given the foregoing discussion associated with FIGS. 1–9, those skilled in the art will appreciate that a number of different aspects and embodiments of the present invention have been introduced. Although developed in the context of example embodiments, those skilled in the art will appreciate that the scope of the present invention is not so limited. For example, in addition to preserving frame transmission order state information at the receive side, those skilled in the art will appreciate that the teachings of the present invention may well be applied to improving the transmission characteristics of a network interface incorporating the teachings of the present invention. That is, in accordance with yet another aspect of the present invention, transmit performance is improved through transmit queue optimization of an appropriately configured network interface, e.g., network interface 103 and/or network interface 105.

Figure 10:
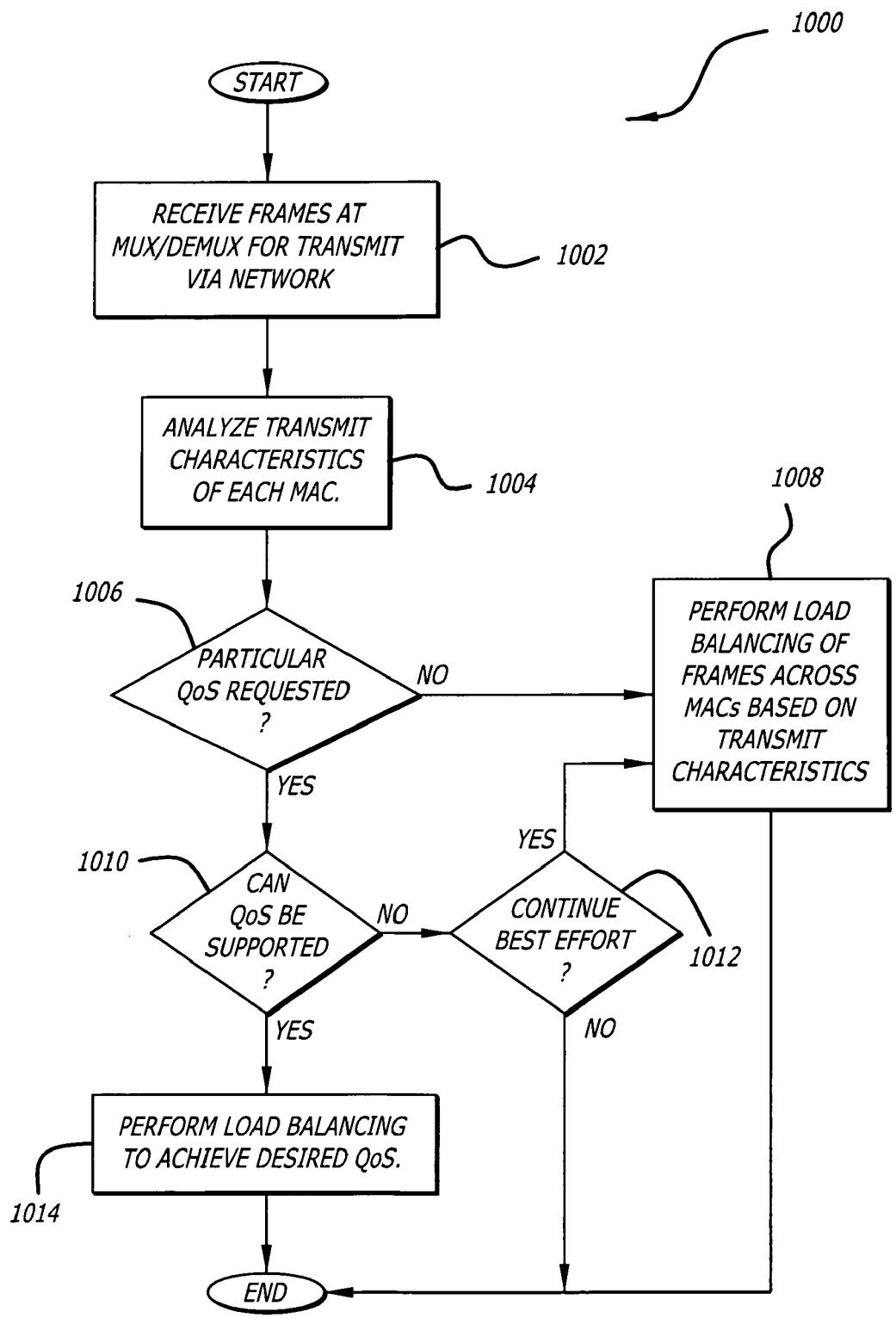
FIG. 10 illustrates a flow chart of an example method for improving the transmit efficiency of a network interface incorporating the teachings of the present invention, in accordance with one aspect of the present invention.

Turning to FIG. 10, a flow chart of an example method for enhancing the transmit efficiency of a network device incorporating the teachings of the present invention is depicted, in accordance with one aspect of the present invention. As depicted in FIG. 7, the method begins wherein MUX 218 receives frames from the DTE for transmission over MLT 106 of data network 100, 1002. At 1004, MUX 218 identifies the transmit performance attributes of each of MACs 210–216. In accordance with one aspect of the present invention, instead of simply alternating through MACs 210–216 in a round-robin fashion queuing frames to be transmitted, MUX 218 makes a qualitative determination of how loaded each of the MACs 210–216 are. In one embodiment, for example, MUX 218 employs a counter to determine the amount of data queued in each MAC 210–216 for transmission, and performs load balancing accordingly. In an alternate embodiment, wherein multi-speed links are employed in MLT 106, MUX 218 employs a counter to determine the amount of data queued in each MAC 210–216 and multiplies this value by the known speed of each link to calculate a loading value for each queue. Given the loading value for each queue, MUX 218 balances the among each MAC 210–216 accordingly. In yet another embodiment, MUX 218 detects a flow condition (as described above) coming from a DTE and directs all frames associated with the flow to a MAC designated as having the least queue depth, thereby minimizing frame delays.

Having identified the transmit performance attributes of each MAC 210–216, MUX 218 further determines whether the frames received from the DTE require a particular priority level of service, e.g., Quality of Service (QoS) level, 1006. If not, MUX 218 performs load balancing of the frames to be transmitted, balancing the frames across available MACs 210–216 in accordance with the identified transmit performance attributes of the MACs 210–216, 1008.

Alternatively, if a particular QoS is requested at block 1006, MUX 218 makes a further determination of whether the QoS can be supported, 1010. If not, MUX 218 prompts the DTE as to whether to continue transmission of the frames on a best-effort basis 1012. If so, MUX 218 performs load balancing across the MACs 210–216 in accordance with the identified transmit performance attributes 1008. If the DTE does not accept the offer of best effort transmission at 1012, MUX 218 denies the transmit request of the DTE and the process ends.

If, at block 1010, the requested QoS can be supported, MUX 218 performs load balancing to achieve the desired QoS, block 1014. In one embodiment, for example, MUX 218 prioritizes the frames ahead of other frames to ensure that the requested QoS is met. In an alternate embodiment, MUX 218 dedicates transmission resources to ensure that the requested QoS is achieved.

While various aspects and alternate embodiments of the present invention have been described above, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, alternative methods and apparatus for preserving frame ordering across aggregated links between a source and destination node has been described.

What is claimed is:

1. A method for improving receive performance in a data network, the method comprising:
    receiving an indication denoting the start of frame transmission of a flow sensitive to out-of-order frame sequences on a corresponding plurality of communication links;
    identifying the start of the flow by analyzing information embedded within at least one received frame;
    dedicating a receive buffer from a plurality of receive buffers to receive all frames associated with the identified flow; and
    assigning a pointer value to each frame for storage within a pointer buffer, each pointer value being based, at least in part, on a relative order in which the indications of start of frame transmissions associated with each frame are received, each pointer value associated with each respective frame being used to preserve a state of frame transmission order according to complete reception of the frame without modifying the respective frame.

2. The method of claim 1, wherein identifying the start of the flow includes analyzing information embedded within each of the received frames, the information includes one or more of the following: source information, destination information, and quality of service associated with said received frame.

3. The method of claim 1, wherein prior to assigning the pointer value, the method further comprising determining whether the identified flow requires preservation of transmission order.

4. The method of claim 3, wherein prior to assigning the pointer value, the method further comprising promoting frames of the received flow in the order received, unless it is determined flow requires preservation of frame order.

5. The method of claim 4, further comprising creating a list of pointer values corresponding to transmission order only if it is determined that the identified flow requires preservation of transmission order.

6. The method of claim 1, wherein prior to assigning the pointer value, the method further comprising promoting the received frames from the dedicated receive buffer in the order received, without regard to frame transmission order, unless it is determined that the identified flow requires preservation of transmission order.

7. The method of claim 6, further comprising determining whether the identified flow requires preservation of transmission order by analyzing protocol identification information embedded within the received frames.

8. The method of claim 1, wherein the receive buffer order does not correspond to the order of frame transmission.

9. The method of claim 1, wherein the receiving of up to the plurality of indications denoting the start of frame transmission includes receiving a plurality of Receive Data Valid signals.

10. Adapted for a data network including a plurality of communication links, a method comprising:
    receiving at least one indication denoting a start of frame transmission of a flow sensitive to out-of-order frame sequences on the corresponding plurality of communication links;
    identifying a received indication denotes commencement of the flow;
    dedicating a buffer from a plurality of buffers to receive all frames associated with the identified flow;
    determining whether the identified flow requires preservation of frame transmission order; and
    assigning a pointer value to each frame without modification of a frame, the pointer value being based, at least in part, on a relative order in which the indications of start of frame transmissions associated with each frame are received, the corresponding pointer value associated with each respective frame being used to preserve a state of frame transmission order according to complete reception of the frame.

11. The method of claim 10, wherein identifying the start of flow includes analyzing information embedded within each of the received frames to determine source and destination information associated with said frames.

12. The method of claim 10 wherein the relying on the received indications comprises promoting frames of the received flow in the order received, unless it is determined flow requires preservation of frame transmission order.

13. The method of claim 10 further comprising creating a list of pointer values corresponding to transmission order only if it is determined that the identified flow requires preservation of frame transmission order.

14. The method of claim 13, further comprising promoting the received frames from the dedicated buffer in the order received, without regard to frame transmission order, unless it is determined that the identified flow requires preservation of frame transmission order.

15. The method of claim 10, further comprising determining whether the identified flow requires preservation of frame transmission order by analyzing protocol identification information embedded within the received frames.

16. The method of claim 10, wherein the buffer order does not correspond to the order of frame transmission.

17. The method of claim 10, wherein the receiving of the at least one indication comprises receiving at least one Receive Data Valid signal.

18. A network device comprising:
 means for receiving an indication to denote commencement of a flow of frame transmissions, the flow being sensitive to out-of-order frame sequences;
 means for indicating at least one receive buffer to receive all frames associated with the flow; and
 means for assigning a pointer value to each frame without modification of a frame, the pointer value being based, at least in part, on a relative order in which the indications of commencement of frame transmissions associated with each frame are received, the corresponding pointer value associated with each respective frame being used to preserve a state of frame transmission order according to complete reception of the frame.

19. The network device of claim 18, further comprising a means for promoting frames of the received flow in the order received, unless it is determined flow requires preservation of frame order.

20. The network device of claim 18, further creating a list of pointer values corresponding to transmission order if it is determined that the identified flow requires preservation of transmission order.

21. A medium having embodied thereon a program for processing by a network device, the program comprising:
 a module to receive an indication to denote commencement of a flow of frame transmissions, the flow being sensitive to out-of-order frame sequences;
 a module to indicate at least one receive buffer to receive all frames associated with the flow; and
 a module to assign a pointer value to each frame without modification of a frame, the pointer value being based, at least in part, on a relative order in which the indications of commencement of frame transmissions associated with each frame are received, the corresponding pointer value associated with each respective frame being used to preserve a state of frame transmission order according to complete reception of the frame.

22. The medium of claim 21, wherein the program further comprises a module to promote frames of the received flow in the order received, unless it is determined flow requires preservation of frame order.

23. The medium of claim 21, wherein the program further comprises a module to assign a pointer value to each frame of the identified flow corresponding to commencement of transmission, creating a list of pointer values corresponding to transmission order only if it is determined that the identified flow requires preservation of transmission order.

24. The medium of claim 21, wherein the indication to denote commencement of the flow of frame transmissions that is received by the module of the program is a Receive Data Valid signal.

25. A method comprising:
 asserting control signals each denoting commencement of a frame transmission of a flow sensitive to out-of-order frame sequences;
 identifying at least one receive buffer to receive all frames associated with the flow; and assigning a pointer value to each frame without modification of a frame, the pointer value being based, at least in part, on a relative order in which the control signals associated with each frame are received, the corresponding pointer value associated with each respective frame being used to preserve a state of frame transmission order according to complete reception of the frame.

* * * * *